Feb. 25, 1930.    A. C. NUNWICK ET AL    1,748,520
HELICOPTER
Filed June 17, 1929
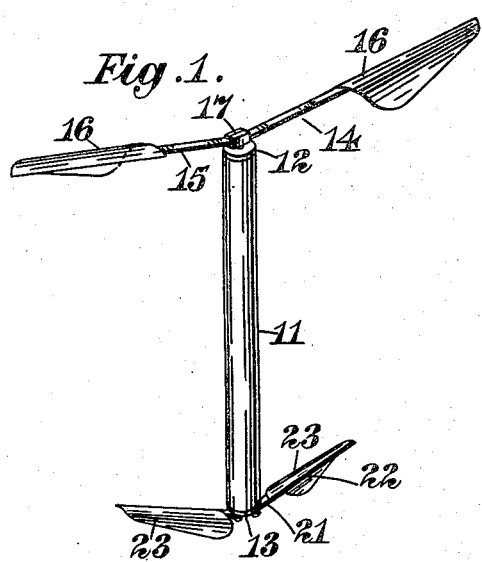
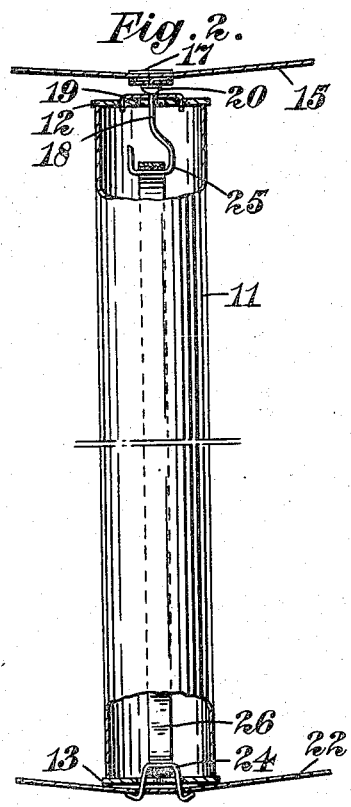
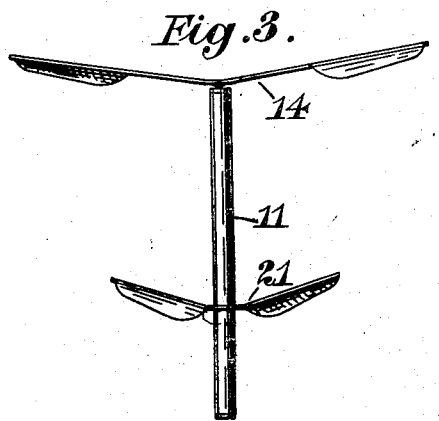
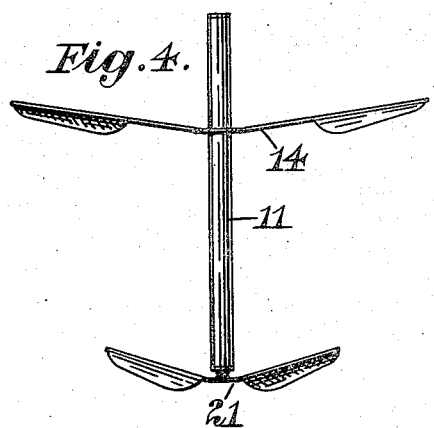
INVENTORS
A. C. Nunwick, A. J. Iago
and K. M. Hunter
By Watson, Ost, Morse & Grindle
ATTYS Patented Feb. 25, 1930

1,748,520

UNITED STATES PATENT OFFICE

ARTHUR CECIL NUNWICK, ARTHUR FRANK IAGO, AND KENNETH MELVILLE HUNTER, OF LONDON, ENGLAND

HELICOPTER

Application filed June 17, 1929, Serial No. 371,478, and in Great Britain May 11, 1928.

This invention is for improvements in or relating to helicopters and has particular reference to helicopters intended to be used as toys.

The invention is concerned with helicopters of the type comprising in combination a body-portion or fuselage, two air-screws of opposite hand spaced apart in the length of the fuselage for rotation about the same axis and means for driving said air-screws in opposite directions so appropriated to the screws that each exerts a lifting effort on the fuselage.

The present invention comprises a helicopter of the type described wherein the air-screws are so constructed or arranged (e. g. with respect to the construction and disposition of their effective surfaces) that the air-screw which is uppermost in flight develops a greater lifting effort than the other air-screw for the purpose of obtaining stability in flight.

Preferably, the air-screw which will be uppermost in flight has a larger span than that of the other air-screw. Further, the blades of the uppermost air-screw (or at least their effective portions) may be arranged to be substantially outside the circumferential compass of the lower air-screw. Also the blades of the lower air-screw may be set at a greater angle of incidence than the blades of the upper air-screw.

In a preferred form the blades of the air-screws are so inclined to the fuselage that considering the helicopter in flight the blades will extend outwardly and upwardly from the fuselage.

In the accompanying drawings there is illustrated by way of example several constructions of helicopter according to this invention.

In the drawings:—

Figure 1 is a perspective view of the helicopter,

Figure 2 is a detail view showing the mounting of the air-screws on the fuselage, and Figures 3 and 4 are elevations of modified constructions of the helicopter.

Like reference numerals indicate like parts in the several figures of the drawings.

Referring to Figures 1 and 2 a body-portion or fuselage in the form of a cardboard tube 11 has thin end caps 12 and 13 of wood glued to the ends of the tube. An air-screw 14 which would be uppermost when the helicopter is in flight is mounted for rotation in the end cap 12 and about the central throughway axis of the tube 11. The air-screw 14 comprises a wooden strip 15 and blades 16 of stiff paper, celluloid or the like. The wooden strip 15 of the air-screw is clamped at its centre in a metal strap 17 which has secured to it a shaft 18.

The shaft 18 passes through a small hole in the bearing disc 19 which rests upon the end cap 12 and is retained by inturned projections which engage in holes in the end cap. A dome-shaped washer 20 is provided between the strap 17 and the bearing disc.

The lower air-screw 21 comprising a wooden strip 22 and blades 23 similar to blade 16 of the uppermost air-screw, is provided at its centre with a wire eye 24 which engages in a slot in the end cap 13 which slot is of such dimensions as to prevent rotation of the air-screw in the end cap. The said shaft 18 of the air-screw 14 is formed at its lower extremity as a hook 25 and a strip of rubber 26 is linked between this hook and the eye of the air-screw 21 preferably in such a manner as to provide a plurality of turns. It will thus be clear that when the rubber strip is twisted by turning the air-screw 14 the two air-screws when released will be rotated in opposite directions.

The blades 16 and 23 of the air-screws are so arranged as to be of opposite hand, that is to say, when they are rotated in the appropriate opposite directions they will both exert a lifting effort.

The blades of both the air-screws are inclined to the tube 11 in such a manner that considering the helicopter in flight with the air-screw 14 uppermost the blades will extend outwardly and upwardly from the fuselage tube 11. The air-screw 14 has a larger span than the air-screw 21 and the blades 16 of the air-screw 14 are arranged substantially outside the compass of the blades 23 of the air-screw 21. The angle of incidence of the blades 16 is also substantially less than the angle of incidence of the blades 23. Further, the pitch of the blades, and their relative areas, may be so arranged that considering the helicopter in sustentation, the axial flow through the disc swept by the lower blades may have the same velocity as the flow through the annulus swept by the upper blades.

When, after energizing the helicopter by twisting up the rubber strip, the helicopter is released the two air-screws will be rotated in opposite directions by the unwinding of the strip. The air-screws being of opposite hand and the rotation being in a proper direction both will thrust a column of air downwards and the helicopter will rise. It will be clear that the upper and lower air-screws of the helicopter may be regarded as the equivalent of a single airscrew, the uppermost blades of the helicopter being that part of the blades of the equivalent airscrew lying outside a given circle described with its axis as centre, the lower air-screw of the helicopter being the equivalent of the part within such circle but with the pitch of the blades reversed e. g. (of opposite hand).

The radius of the said circle, for the purpose of determining the blade form may be such that the areas of the upper blades may be greater or less than, or equal to, the areas of the lower blades; thus the blades may be proportioned so that they may rotate in opposite directions at equal speed, or at different speeds with relation to each other. A preferred arrangement is one in which the lower blades are slightly less in area than the upper ones and rotate faster, e. g. the tip speeds may be equal. It will be clear that the uppermost airscrew having the lesser angle of incidence and the greater span will be more efficient as a lifting airscrew and thus as the greater part of the lifting effort is developed by this airscrew the helicopter will be stable in flight. The lower airscrew 21 is retained in position by the tension in the rubber strip which in effect provides a resilient connection for the lower airscrew and the tube 11 and thus largely obviates possible damage of the lower air-screw when the helicopter falls after a flight.

It will be understood in the construction just described that the fuselage tube 11 will rotate with the air-screw 21. Alternatively, the air-screw 21 may be rotatably mounted in the end cap 13 by providing it with a shaft and bearing similar to that provided for the air-screw 14.

Instead of connecting the lower air-screw to the end cap 13 it may be rigidly secured to the tube 11 at some distance from that end of the tube which will be lowermost in flight as shown in Figure 3. Alternatively, the air-screw 14 which is uppermost in flight may be rigidly secured to the tube 11 at some distance from the top of the tube and the lower air-screw 21 will then be rotatably mounted in the lower end cap 13 in a similar manner to the mounting of the air-screw 14 in Figure 2. In both the constructions shown in Figures 3 and 4, the rubber strip 26 is looped on to the hook formation of the shaft of the rotatable air-screw and on to a suitable hook secured to the tube 11 at the opposite end thereof.

It will be understood that modifications may be made in the construction of the helicopters hereinbefore described without departing from the invention.

We claim:—

1. A toy helicopter comprising a fuselage, two air-screws of opposite hand disposed at spaced points on the fuselage for rotation about the same axis, and means for driving said air-screws in opposite directions, the air-screw at the leading end of the helicopter in launching being larger in span than the following air-screw, whereby a greater lifting effort will be developed by the leading air-screw for the purpose of obtaining stability.

2. A toy helicopter comprising a fuselage, two air-screws of opposite hand disposed at spaced points on the fuselage for rotation about the same axis, and means for driving said air-screws in opposite directions, the effective portions of the air-screw at the leading end of the helicopter in launching being substantially outside the circumferential compass of the effective portions of the other air-screw, whereby the leading air-screw will develop the greater lifting effort for the purpose of obtaining stability.

In testimony whereof we have signed our names to this specification.

ARTHUR CECIL NUNWICK.
ARTHUR FRANK IAGO.
KENNETH MELVILLE HUNTER.